United States Patent [19]
Bar-Yaakov et al.

[11] Patent Number: 6,127,558
[45] Date of Patent: Oct. 3, 2000

[54] HIGH SOFTENING POINT, LOW MOLECULAR WEIGHT EPOXY RESIN

[75] Inventors: Yoav Bar-Yaakov, Beer-Sheva; Daniel Plewinski, Meitar, both of Israel

[73] Assignee: Bromine Compounds Ltd., Israel

[21] Appl. No.: 09/068,261

[22] PCT Filed: Sep. 2, 1996

[86] PCT No.: PCT/IL96/00094

§ 371 Date: May 5, 1998

§ 102(e) Date: May 5, 1998

[87] PCT Pub. No.: WO97/17389

PCT Pub. Date: May 15, 1997

[30] Foreign Application Priority Data

Nov. 6, 1995 [IL] Israel ......................................... 115881

[51] Int. Cl.⁷ .................................................. C07D 303/08
[52] U.S. Cl. .......................... 549/559; 549/541; 549/555; 549/558
[58] Field of Search ..................... 549/541, 555, 549/558, 559

[56] References Cited

U.S. PATENT DOCUMENTS 3,058,946  10/1962  Nametz ...................................... 260/42
4,221,893   9/1980  Behar et al. .............................. 525/438
4,654,383   3/1987  Corley ...................................... 523/462
4,873,309  10/1989  Corley ...................................... 528/102

FOREIGN PATENT DOCUMENTS

97/09374   3/1997   WIPO .

OTHER PUBLICATIONS

Stanley R. Sandler and Wolf Karo, Polymer Syntheses vol. II, Academic Press, ISBN 0–12–618502–6, pp. 80–83, 1977.

Yu.M. Cheban et al., Dokl. Akad. Nauk USSR (1985), 283(3), pp. 621–624.

Yu. N. Safyanova et al., Gor'k , Issled. Fiz.–Tekh. Inst., Gorkiy, USSR, Zh. Strukt. Khim. (1984), 25(4), pp. 156–157.

*Primary Examiner*—Ba K. Trinh
*Attorney, Agent, or Firm*—Lerner, David, Littenberg, Krumholz & Mentlik, LLP

[57] ABSTRACT

Epoxy resins which are diglycidyl ethers of tetrabromobisphenol A having a crystalline structure and in particulate form have an epoxy equivalent weight between 320 and 380 g/eq and a chlorine content that is smaller than 0.3%.

23 Claims, No Drawings

HIGH SOFTENING POINT, LOW MOLECULAR WEIGHT EPOXY RESIN

This application is a 371 of PCT/IL96/00094 fated Sep. 2, 1996.

FIELD OF THE INVENTION

This invention relates to epoxy resins and, more specifically, to diglycidyl ethers of tetrabromobisphenol A (hereinafter TBBA), having a crystalline structure and a higher softening point than like prior art resins having an amorphous structure.

BACKGROUND OF THE INVENTION

Diglycidyl ethers of TBBA are known in the art and have a wide varietv of applications, such as: raw materials for self-extinguishing epoxy laminates, flame retardants for phenolic laminates and for thermoplastic materials, raw materials for modified epoxy resins, and high molecular weight epoxy resins, powder coatings, dry epoxy molding compounds, heat stabilizers for halogenated organic compounds, and so forth.

The lower the molecular weight of the brominated epoxy resins, based on tetrabromobisphenol A, the lower their softening points are. For example, when the molecular weight decreases from 4,000 to 700 g/mol, the softening point decreases from 160° C. to 55° C. The handling and the transportation of low softening point or semi-solid materials are both complicated and expensive, since such materials tend to stick to their containers. In some uses, such as in powder coating and solid molding compounds, there is a need for high softening point materials with high concentrations of epoxy groups, viz. with low molecular weight. It is possible, in principle, to raise the softening point by the use of additives, such as materials having a high surface area, but the presence of such material is not always acceptable, and anyway, their ability to raise to the softening point is limited.

It is a purpose of this invention to provide brominated epoxy resins based on TBBA, and specifically, diglycidyl ethers of TBBA, having a low molecular weight and a higher softening point than materials of the same molecular weight known in the prior art.

It is another purpose of this invention to provide such resins having a specific crystalline structure.

It is a further purpose of this invention to provide such resins with a high flowability in the particulate solid state (powder or flakes), that are easy to package and to transport in bulk or bags.

It is a still further purpose of this invention to provide a method for producing such resins, which is economical and has a substantially quantitative yield.

It is a still further purpose of this invention to provide a method which has a very high and practically quantitative yield.

Other purposes and advantages of this invention will appear as the description proceeds.

SUMMARY OF THE INVENTION

The epoxy resins to which this invention refers are diglycidyl ethers of tetrabromobisphenol A, having the general formula

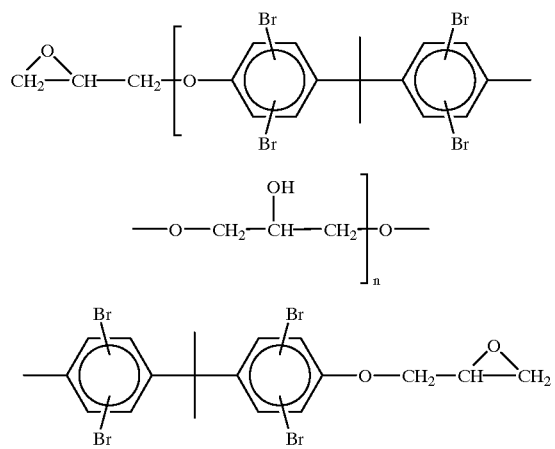

wherein n has an average value, in any batch of resins, between 0.0 and 0.2.

Said ethers have an epoxy equivalent weight (hereinafter EEW) between 320 and 380 g/eq and a chlorine content that is smaller than 0.3%. Epoxy equivalent weight is given, per standard definition, by the molecular weight of the substance divided by the number of epoxy groups contained therein. Such brominated epoxy resins can be produced from TBBA epichlorohydrine and sodium hydroxide as described, for instance, in Polymer Syntheses, Vol. II, S. R. Sandier and W. Karo, Academic Press Inc., ISBN 0-12618502, pp. 80–81.

The product obtained from this synthesis according to the prior art is an amorphous product and is obtained in bulk form. The invention provides a product that is an epoxy resin having the aforesaid formula and which is characterized by a specific crystalline form and has a correspondingly increased softening point, which is generally about 100° and 120° C.

The specific crystalline form of the product is characterized by the presence, in the diffraction pattern of the product, of the following seven strong diffraction peaks:

d-value, Å
9.85
9.66
4.12
4.06
4.04
3.96
3.91

The invention further comprises a method for imparting to amorphous epoxy resin having the aforesaid formula, produced by prior art methods such as that hereinbefore mentioned, a crystalline structure and a consequently higher softening point.

In a form of the invention, said method comprises crystallizing the product by heating to temperatures from 40° to 109° C., preferably from 45° to 100° C. In a preferred form of the invention, the crystallization of the product is carried out in the presence of seeding agents, which are preferably crystals of the brominated epoxy resin being treated, and are used in an amount of less than 50% and preferably less than 10% by weight. The seeding crystals can be prepared by heating the amorphous product to 90° C. for 14 days. Their use accelerates the crystallization process, which in their absence takes from 2 to 30 days, while in their presence is completed in 1 to 12 hours.

In another form of the invention, the amorphous brominated epoxy resin is dissolved in an organic solvent which is a weak solvent for the crystalline resin. Examples of such solvents are toluene, benzene, xylene, methylethylketone, methylisobutylketone, acetone and mixtures thereof. Then, the resin is precipitated in crystalline form from the solvent, either by cooling the solution or by adding co-solvents. Examples of such co-solvents are alcohols, such as methanol, ethanol, propanol etc. The precipitated crystals are then separated from the solvent by filtration, washing, and evaporation. In this form of the invention too, seeding crystals are preferably used in the precipitation stage.

Yu. M. Cheban et al., Dokl. Akad. Nauk USSR (1985), 283(3), 621–4 describe the structure of monocrystals obtained by slow evaporation of the aforesaid diglycidyl ether of TBBA from alcohol-toluene solutions by slow evaporation. A similar study is reported by Yu. N. Safyanova et al. in Gor'k, Issled. Fiz.-Tekh. Inst., Gorkiy, USSR, Zh. Strukt. Khim. (1984), 25(4), 156–7. However, the slow evaporation is not an acceptable industrial method, and further, it has a limited yield, as a considerable amount of the product remains in the solvent. In any case, the crystalline structure obtained by those authors is different from that according to the invention.

The crystalline epoxy resins according to the present invention may have various applications and are useful as flame retardants for phenol formaldehyde resin and for thermoplastic materials. Said crystalline epoxy resins are useful as raw materials for self extinguishing epoxy laminates and as raw materials for the preparation of modified epoxy resins or higher molecular weight epoxy resins. The crystalline epoxy resins according to the present invention are also useful as components of powder coating formulations or epoxy molding compounds.

DETAILED DESCRIPTION OF PREFERRED EMBODIMENTS

The following examples are illustrative of the invention, but have no limitative significance.

EXAMPLE 1

500 g of a commercial diglycidyl ether of tetrabromobisphenol A, made from TBBA epichlorohydrine, as hereinbefore set forth, sold by Dead Sea Bromine Group Ltd, hereinafter F-2200, and having the following analysis:

bromine content—48.5%

EEW—343 g/eq hydrolyzable chlorine—0.02% softening point—53° C. was heated to 90° C., whereby a thick, viscous mass was obtained. The mass was intimately mixed with one g of crystalline F-2200. The material was then spread onto a stainless steel tray to form a layer 3 mm thick. The tray was placed into an oven and heated to 90° C. for 12 hours. The resulting product is a white crystalline solid with a softening point of 111C and fusion heat of 38 JIG.

Its diffraction pattern was determined as follows. X-ray data were obtained with the Phillips Diffractometer PW 1050170, using Cu Kα radiation, Graphite monochromator, 40 kv, 28 ma. Said diffraction pattern exhibits the diffraction peaks listed hereinbefore.

EXAMPLE 2

200 g of F-2200 starting material of Example 1 were introduced with 100 g of toluene into a 500 ml glass flask. The content of the flask was heated to 80° C. until complete solution was effected. The solution was then cooled to room temperature, and 2 g of crystalline F-2200 were added. The mixture was stirred for 12 hours at room temperature. A white crystalline solid was precipitated from the solution, which was separated from the liquid by filtration. The residual solvent was evaporated from the solid by applying a vacuum of 3000 Pa and heating to 80° C. 120 g of crystalline product, having a softening point of 111° C., were obtained. Its crystalline structure is essentially the same as that of the product of Example 1.

The following Examples 3 and 4 illustrate uses of the products according to the invention.

EXAMPLE 3

Stabilization of HBCD

Hexabromocyclododecane (HBCD) is a flame or fire retardant (hereinafter sometimes abbreviated as FR) widely used in polystyrene foams. One of the limitations of HBCD is its low thermal stability. A good thermal stability is particularly important when plastic goods are manufactured by extrusion of polystyrene foams or by injection molding of dense high impact polystyrene and polypropylene. Common grades of HBCD start to decompose thermally at about 150° C., and, to avoid corrosion of the processing equipment, it is necessary to add large quantities (usually more than 5% by weight) of expensive thermal stabilizers. Such thermal stabilizers are lead dibasic phthalate, tin maleates, epoxies and polyepoxide compounds. One of the problems with these stabilizers is health hazards which limit their use. For instance, the tris(2,3-epoxypropyl)isocyanurate (TEPIC), which is potentially carcinogenic, must be used with great precaution. Further, the use of lead stabilizers is often banned or strictly limited in many industrialized countries.

It is desirable to have grades of HBCD fire retardants having better thermal stability than those of the prior art, thereby permitting the use of higher processing temperatures and/or longer residence times at high temperatures.

The purpose is achieved by using another brominated flame retardant as thermal stabilizer of the HBCD. Said brominated flame retardant is chosen in the family of the brominated epoxy resins, such as, for instance, tetrabromobisphenol A diglycidyl ethers.

It was surprisingly found that the lower the molecular weight of the brominated epoxy oligomer, the better the thermal stabilization of its mixture with HBCD. A mixture of HBCD, manufactured and sold by Bromine Compounds Ltd. under the denomination FR-1206, with different stabilizers, have been prepared and their thermal stability has been tested by isothermal thermogravimetric analysis, evidencing a spectacular improvement for mixture of HBCD stabilized by a low molecular weight brominated epoxy resin according to the present invention. This is shown in table I:

TABLE I

ISOTHERMAL THERMOGRAVIMETRIC ANALYSIS
FOR HBCD STABILIZED WITH BROMINATED
EPOXY RESINS
(Under air)

| Stabilizer | | | |
|---|---|---|---|
| EEW of stabilizer (g/eq) | 343* | 500 comparative | 800 comparative |

TABLE I-continued

ISOTHERMAL THERMOGRAVIMETRIC ANALYSIS
FOR HBCD STABILIZED WITH BROMINATED
EPOXY RESINS
(Under air)

| Composition | | | |
|---|---|---|---|
| HBCD content (%) | 85 | 85 | 85 |
| stabilizer content (%) | 15 | 15 | 15 |
| Thermal Stability at T = 220° C. | | | |
| weight loss after 20 min (%) | 3 | 71 | 72 |

*: from example 1

It was imposible to dry mix HBCD with low melting F-2200 as it sticks to the mixer.

EXAMPLE 4

Preparation of Tribromophenol Modified Epoxy Resin 690 g of crystallized F-2200 made as in Example 1, 150 g of TBBA and 450.0 g of 2,4,6-tribromophenol (hereinafter TBP), were loaded into a 1 liter capacity separable flask equipped with thermometer and agitator. Then, the inner flask atmosphere was substituted with nitrogen gas, and the mixture was heated and fused. Then, 1.3 g of 10% sodium hydroxide aqueous solution were added at 100° C., and a reaction was performed for 12 hours at a temperature range between 150–180° C. With the reaction having been completed, the reaction product was drained into a stainless pan, cooled and ground, and a lemon-yellow powder of the combustion inhibitor was obtained. EEW: 20000, softening point: 116° C., bromine content 57%.

EXAMPLE 5

Comparative

Preparation of Tribromophenol modified epoxy resin In order to do the same with low melt F-2200, it was melted at 120° C. and the melt was charged to the reaction flask. Otherwise, the preparation was essentially the same as in example 4.

While embodiments of the invention have been described by way of illustration, it will be apparent that the invention may be carried out by persons skilled in the art, with many modifications, variations and adaptations, without departing from its spirit or exceeding the scope of the claims.

What is claimed is:

1. Epoxy resins, which are diglycidyl ethers of tetrabromobisphenol A of the general formula

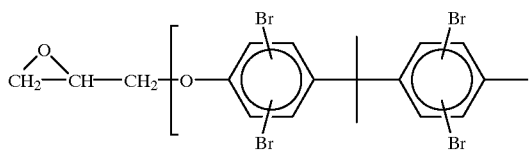
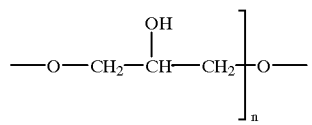
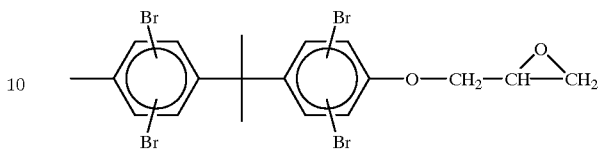

wherein n has an average value, in any batch of resins, between 0.0 and 0.2, having an epoxy equivalent weight between 320 and 380 g/eq and a chlorine content that is smaller than 0.3%, which are crystalline and in particulate form, wherein their crystalline structure is characterized by the presence, in the diffraction pattern, of the following seven strong diffraction peaks:

d-value, Å
9.85
9.66
4.12
4.06
4.04
3.96
3.91.

2. Resins according to claim 1, having a softening point from 100° to 120° C.

3. Resins according to claim 1, in powder or flake form.

4. Method for producing epoxy resins having a crystalline struture which are diglycidyl ethers of tetrabromobisphenol A, having the general formula

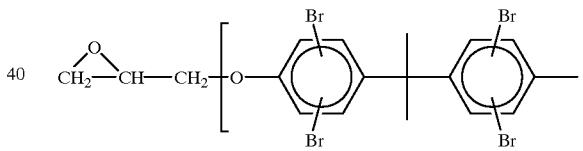
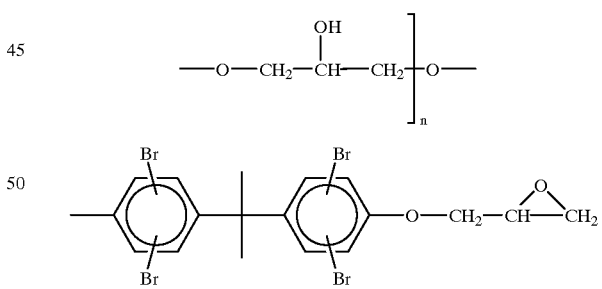

wherein n has an average value, in any batch of resins, between 0.0 and 0.2, and having a high softening point, and wherein said epoxy resins have epoxy equivalent weights between 320 and 380 g/eq, which comprises producing such resins having an amorphous structure and imparting to them a crystalline structure.

5. Method according to claim 4, which comprises crystallizing the amorphous resin by heating it to temperatures from 40° to 109° C. and spreading the resin in thin layers.

6. Method according to claim 5, which comprises crystallizing the amorphous resin by heating it to temperatures from 45° to 100° C.

7. Method according to claim 4, which comprises dissolving the amorphous resin is in an organic solvent which is a weak solvent for the crystalline resin, and precipitating the resin in crystalline form from the solvent, by cooling the solution or by adding co-solvents.

8. Method according to claim 7, wherein the solvents are chosen from among toluene, benzene, xylene, methylethylketone, methylisobutylketone, acetone and mixtures thereof.

9. Method according to claim 7, wherein the co-solvents are alcohols.

10. Method according to claim 9, wherein the alcohols are chosen from among methanol, ethanol, propanol and the like.

11. Method according to claim 7, wherein the precipitated crystals are separated from the solvent by filtration, washing, and evaporation.

12. Method according to claim 5 or 7, which comprises carrying out the crystallization in the presence of seeding agents, which are crystals of the resin being treated.

13. Method according to claim 12, wherein the seeding agents are used in an amount of less than 50% by weight of the resin.

14. Method according to claim 13, wherein the seeding agents are used in an amount of less than 10% by weight of the resin.

15. A heat stabilizer for fire retardant compounds comprising crystalline epoxy resins which are diglycidyl ethers of tetrabromobisphenol A, having the general formula

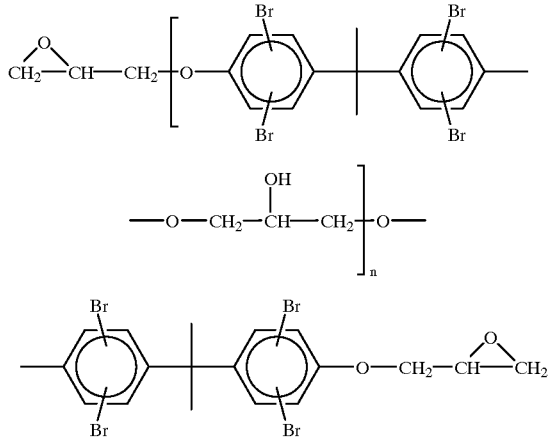

wherein n has an average value, in any batch of resins, between 0.0 and 0.2, and having a high softening point.

16. Flame retardants for phenol formaldehyde resin and for thermoplastic materials comprising crystalline epoxy resins which are diglycidyl ethers of tetrabromobisphenol A, having the general formula

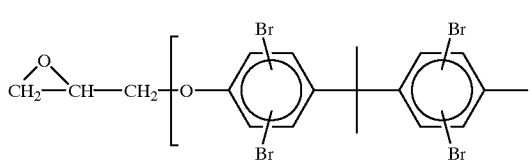
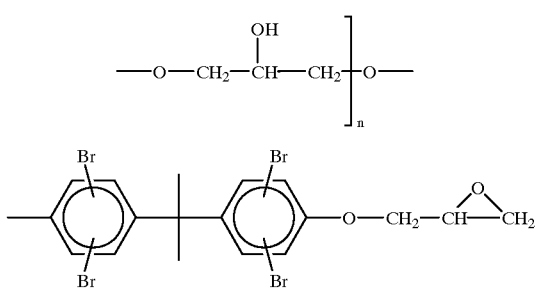

wherein n has an average value, in any batch of resins, between 0.0 and 0.2, and having a high softening point.

17. Raw material for self extinguishing epoxy laminates or raw materials for the preparation of modified epoxy resins or higher molecular weight epoxy resins comprising crystalline epoxy resins which are diglycidyl ethers of tetrabromobisphenol A, having the general formula

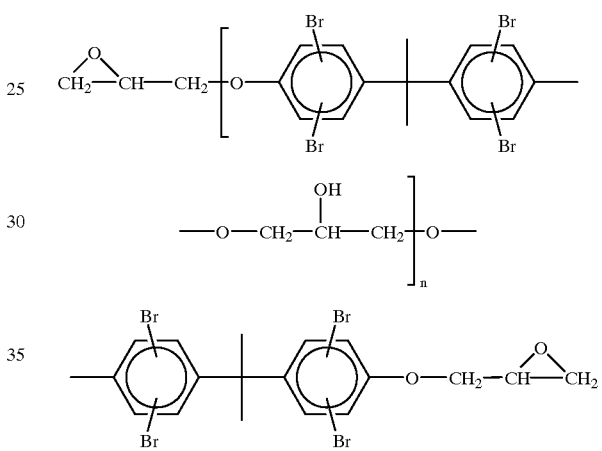

wherein n has an average value, in any batch of resins, between 9.0 and 0.2, and having a high softening point.

18. Components of powder coating formulations or epoxy molding compounds comprising crystalline epoxy resins which are diglycidyl ethers of tetrabromobisphenol A, having the general formula

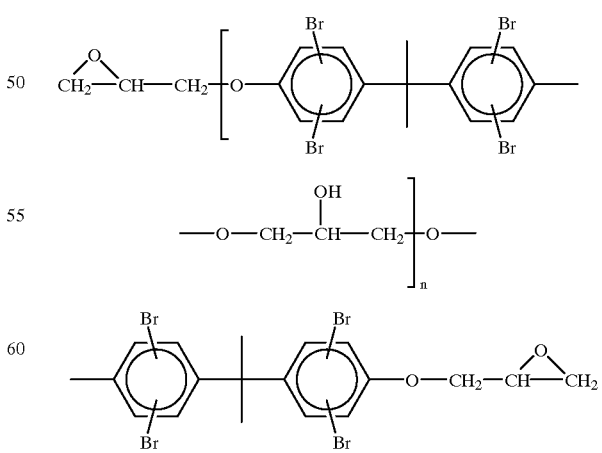

wherein n has an average value, in any batch of resins, between 0.0 and 0.2, and having a high softening point.

19. A heat stabilizer for fire retardant compounds as in claim 15, wherein said epoxy resins have epoxy equivalent weights between 320 and 380 g/eq and chlorine contents that are smaller than 0.3%, which are crystalline and in particulate form, wherein their crystalline structure is characterized by the presence, in the diffraction pattern, of the following seven strong diffraction peaks:

d-value, Å
9.85
9.66
4.12
4.06
4.04
3.96
3.91.

20. Flame retardants for phenol formaldehyde resin and for thermoplastic materials as in claim 16, wherein said epoxy resins have an epoxy equivalent weight between 320 and 380 g/eq and a chlorine content that is smaller than 0.3%, which are crystalline and in particulate form, wherein their crystalline structure is characterized by the presence, in the diffraction pattern, of the following seven strong diffraction peaks:

d-value, Å
9.85
9.66
4.12
4.06
4.04
3.96
3.91.

21. Raw material for self extinguishing epoxy laminates or raw materials for the preparation of modified epoxy resins or higher molecular weight epoxy resins as in claim 17, wherein said epoxy resins have an epoxy equivalent weight between 320 and 380 g/eq and a chlorine content that is smaller than 0.3%, which are crystalline and in particulate form, wherein their crystalline structure is characterized by the presence, in the diffraction pattern, of the following seven strong diffraction peaks:

d-value, Å
9.85
9.66
4.12
4.06
4.04
3.96
3.91.

22. Components of powder coating formulations or epoxy molding compounds as in claim 18, wherein said epoxy resins have an epoxy equivalent weight between 320 and 380 g/eq and a chlorine content that is smaller than 0.3%, which are crystalline and in particulate form, wherein their crystalline structure is characterized by the presence, in the diffraction pattern, of the following seven strong diffraction peaks:

d-value, Å
9.85
9.66
4.12
4.06
4.04
3.96
3.91.

23. A method for producing epoxy resins which are diglycidyl ethers of tetrabromobisphenol A as in claim 4 wherein said epoxy resins are crystalline and in particulate form, wherein their crystalline structure is characterized by the presence, in the diffraction pattern, of the following seven strong diffraction peaks:

d-value, Å
9.85
9.66
4.12
4.06
4.04
3.96
3.91.

* * * * *

UNITED STATES PATENT AND TRADEMARK OFFICE
CERTIFICATE OF CORRECTION

PATENT NO. : 6,127,558
DATED : October 3, 2000
INVENTOR(S) : Bar-Yaakov et al.

It is certified that error appears in the above-identified patent and that said Letters Patent is hereby corrected as shown below:

Column 1, line 4, "fated" should read -- dated --.
Column 2, line 27, begin a new paragraph with "Such".
Column 2, line 30, "81" should read -- 83 --.
Column 3, line 27, "self extinguishing" should read -- self-extinguishing --.
Column 3, line 56, "111C" should read -- 111°C --.
Column 3, line 59, "1050170" should read -- 1050/70 --.
Column 4, line 51, "have" should read -- has --.
Column 4, line 51, "their" should read -- its --.
Column 5, line 46, begin a new paragraph with "In".
Column 8, line 16, "self extinguishing" should read -- self-extinguishing --.
Column 8, line 42, "9.0" should read -- 0.0 --.
Column 9, line 35, "self extinguishing" should read -- self-extinguishing --.

Signed and Sealed this

Twenty-second Day of May, 2001

*Attest:*

NICHOLAS P. GODICI

*Attesting Officer*    *Acting Director of the United States Patent and Trademark Office*